US012297997B1

(12) United States Patent
Yu

(10) Patent No.: US 12,297,997 B1
(45) Date of Patent: May 13, 2025

(54) FAN LAMP

(71) Applicant: Huanyuan Yu, Guangdong (CN)

(72) Inventor: Huanyuan Yu, Guangdong (CN)

( * ) Notice: Subject to any disclaimer, the term of this patent is extended or adjusted under 35 U.S.C. 154(b) by 0 days.

(21) Appl. No.: 19/004,546

(22) Filed: Dec. 30, 2024

(51) Int. Cl.

| | |
|---|---|
| ***F21V 33/00*** | (2006.01) |
| ***F04D 25/08*** | (2006.01) |
| ***F04D 29/34*** | (2006.01) |
| ***F04D 29/64*** | (2006.01) |
| ***F21S 8/06*** | (2006.01) |
| ***F21V 19/00*** | (2006.01) |
| ***F21V 21/03*** | (2006.01) |
| ***F21V 29/503*** | (2015.01) |
| ***F21V 29/67*** | (2015.01) |
| *F21Y 105/18* | (2016.01) |
| *F21Y 115/10* | (2016.01) |

(52) U.S. Cl.

CPC ........ *F21V 33/0096* (2013.01); *F04D 25/082* (2013.01); *F04D 25/088* (2013.01); *F04D 29/34* (2013.01); *F04D 29/646* (2013.01); *F21S 8/063* (2013.01); *F21V 19/0055* (2013.01); *F21V 21/03* (2013.01); *F21V 29/503* (2015.01); *F21V 29/677* (2015.01); *F21Y 2105/18* (2016.08); *F21Y 2115/10* (2016.08)

(58) Field of Classification Search

CPC ............................ F21V 33/0096; F21S 8/063

See application file for complete search history.

(56) References Cited

U.S. PATENT DOCUMENTS

2019/0242392 A1* 8/2019 Whitmire .................. F04F 5/16

FOREIGN PATENT DOCUMENTS

CN 207795642 U * 8/2018

* cited by examiner

*Primary Examiner* — Fatima N Farokhrooz

(74) *Attorney, Agent, or Firm* — Nicholas Makridakis

(57) ABSTRACT

A fan lamp is provided, which includes a ceiling panel that can be installed on a ceiling; a suspension rod that is connected to a bottom of the ceiling panel; a fan motor that is fixed at a bottom of the suspension rod; a fan panel and a lamp panel coaxial with the fan motor and provided below the fan motor in sequence; a connection rod passing through the fan panel and the lamp panel in sequence and provided at a bottom of the fan motor; a locking piece provided at a bottom of the connection rod; a clamp slot, a first clamping component, a rotating ring, and a LED light source. The structure of the present disclosure is reasonable and can synchronously complete the positioning of multiple fan blades, ensuring the smooth and reliable installation of the rotating ring.

10 Claims, 7 Drawing Sheets

FAN LAMP

TECHNICAL FIELD

The present disclosure relates to the field of fan lamp technologies, and in particular, to a fan lamp.

BACKGROUND

Fan lamp is a common household appliance structure, which includes a suspension rod, a fan motor, a fan panel, several fan blades, and a lighting fixture structure. The fan blades are mostly fixed to the fan panel with screws, which not only renders disassembly and assembly inconvenient and affects the efficiency of disassembly and assembly, but also renders the screws easy to rust after long-term use, thereby affecting the stability and reliability of use. Therefore, the applicability and practicality are limited. Furthermore, after working for a long time, the fan motor and the light source will heat up, and the service life of the fan lamp will be reduced if worked for a long time in a high temperature environment. This will greatly reduce the service life of the fan lamp.

SUMMARY

The purpose of the present disclosure is to provide a fan lamp.

In order to achieve the above objectives, the present disclosure adopts the following scheme.

The fan lamp including a ceiling panel that is capable of being installed on a ceiling, a suspension rod is connected to a bottom of the ceiling panel; a fan motor is fixed at a bottom of the suspension rod; a fan panel and a lamp panel that are coaxial with the fan motor are provided below the fan motor in sequence; a connection rod passing through the fan panel and the lamp panel in sequence is provided at a bottom of the fan motor; and a locking piece is provided at a bottom of the connection rod;

where a plurality of clamp slots are provided on an outer wall of the fan panel along a circumference, and fan blades are inserted into the clamp slots;

a first clamping component is capable of fixing the fan blades in the clamp slots;

a rotating ring is connected with a protective cover at the bottom of the ceiling panel, thereby forming an annular spacer region between the fan panel and the protective cover;

a rotating ring that is capable of rotating along an axis of the fan motor is provided on the annular spacer region;

an annular recess communicates with the clamp slots is provided on the fan panel;

a second clamping component that is capable of extending into the clamp slots and fixing the fan blades is provided at a bottom of the rotating ring;

a LED light source is provided in the lamp panel, and a lampshade is provided at a bottom of the lamp panel;

a cooling air duct is provided between the fan motor and the lamp panel;

the cooling air duct allows air to enter from the fan motor, flow out from the lamp panel, and supply to the LED light source when the fan panel is rotated.

In some embodiments of the present disclosure, the first clamping component includes a buckle elastic piece provided at tops of the clamp slots, and one end of the buckle elastic piece is inclined downward;

one ends of the fan blades that are inserted into the clamp slots are provided with a clamp bulge piece;

a bump block is fixed on a top surface of the clamp bulge piece, and the clamp bulge piece passes through the clamp slots;

one end of the buckle elastic piece abuts against an outer end surface of the bump block to prevent the fan blades from slipping out.

In some embodiments of the present disclosure, the second clamping component includes a C-shaped buckle groove provided on a side of the clamp bulge piece, a protruding portion that matches the number of the clamp slots is integrally formed on a bottom edge of the rotating ring, and a clamp protrusion is provided at a bottom of a side of the protruding portion; the protruding portion is located in the clamp slots and extended into the annular recess; a through groove is provided between the annular recess and the clamp slots; the clamp protrusion passes through the through groove and is inserted into the C-shaped buckle groove to position the fan blades.

In some embodiments of the present disclosure, a locking screw is provided on a side of the lamp panel;

the protruding portion is rotated within the annular recess and is locked and positioned by the locking screw.

In some embodiments of the present disclosure, the number of the fan blades is three, four, or five;

the number of the clamp slots matches the number of the fan blades.

In some embodiments of the present disclosure, the rotating ring is a plastic structure or a metal structure.

In some embodiments of the present disclosure, the LED light source includes a LED light board provided below the lamp panel, and LED light beads are distributed at a bottom of the LED light board;

threaded holes are respectively provided on the LED light board and the lamp panel, and the LED light board is connected to the lamp panel through screws.

In some embodiments of the present disclosure, the fan motor is composed of a motor housing, a motor stator, and a motor rotor;

an annular groove is formed between the motor housing and the motor rotor; an annular plate is provided on a top axis of the fan panel, and the annular plate is inserted into the annular groove; the annular plate is adhered to the motor rotor, when the motor rotor is rotated, the annular plate is driven to rotate by frictional force.

In some embodiments of the present disclosure, the locking piece includes a first through hole provided on an axis of the fan panel, a second through hole provided on an axis of the lamp panel, and the connection rod sequentially passes through the first through hole and the second through hole; an external thread is provided at the bottom of the connection rod, and a nut is threaded on the external thread.

In some embodiments of the present disclosure, the cooling air duct includes a plurality of air inlet ports provided at a top of the motor housing along a circumference, a top of the fan panel that is located in the annular plate is provided with a plurality of wind blades along a circumference, and a plurality of air outlet ports are provided on the lamp panel along a circumference;

when the fan panel is rotated, the wind blades are rotated accordingly, air enters from the air inlet ports and is sprayed out from the air outlet ports, and air flow cools down the fan motor and the LED light source.

In summary, the beneficial effects of the present disclosure compared to the prior art are as follows: the structure of the present disclosure is reasonably, the clamp slots provided on a side of the fan panel, a rotating ring provided on a top surface of the fan panel, and protrusion portion and buckle protrusions on a bottom edge of the rotating ring, which are matched with the clamp protrusion and the C-shaped buckle groove on the fan blades. During assembly, all fan blades are placed in different clamp slots, and then the rotating ring is attached to a top surface of the fan panel and rotated to insert an end of the buckle protrusion into the C-shaped buckle groove. This can synchronously complete the positioning of multiple fan blades, improve assembly efficiency, and limit the buckle protrusion through a limit support rod. It can also ensure the smooth and reliable installation of the rotating ring, with convenient operation and stable and reliable use, which is conducive to improving the efficiency of disassembly and assembly, convenient for maintenance and repair operations, without rusting, thereby improving the effectiveness of use and having strong practicality.

At the same time, when the fan lamp is rotated, air can be drawn into the motor housing through the air inlet ports and then discharged from the air outlet ports of the fan panel by rotating the fan blades provided on the fan panel. In this process, the air first passes through a motor stator and a motor rotor on the motor to cool it down, and then when discharged from the air outlet ports, it cools the LED light source below the fan panel. This can reduce the temperature of the fan motor and the LED light source during operation, thereby improving the service life of the fan lamp.

Figure 1:
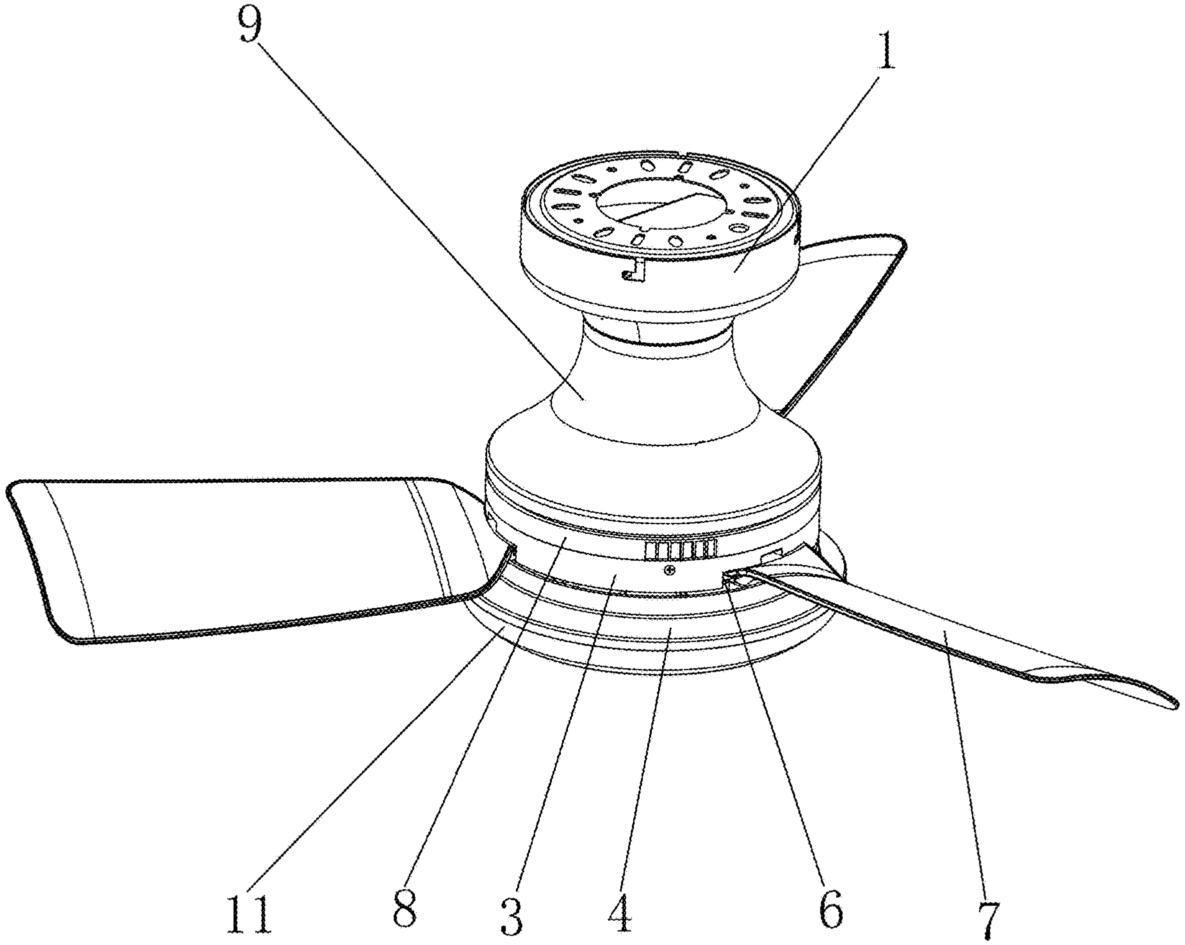
FIG. 1 is a perspective view of the present disclosure.
Figure 2:
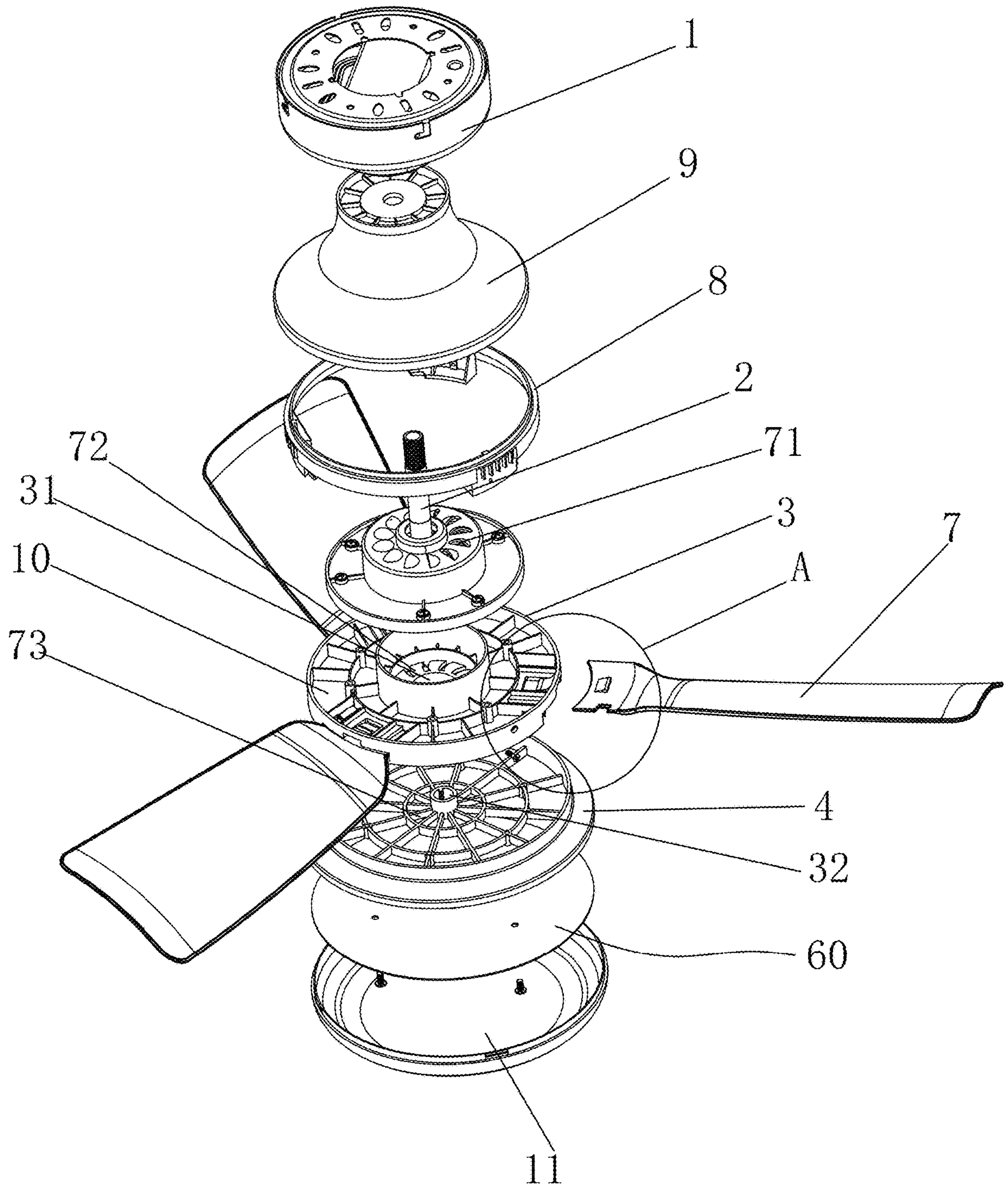
FIG. 2 is a first exploded view of the present disclosure.
Figure 3:
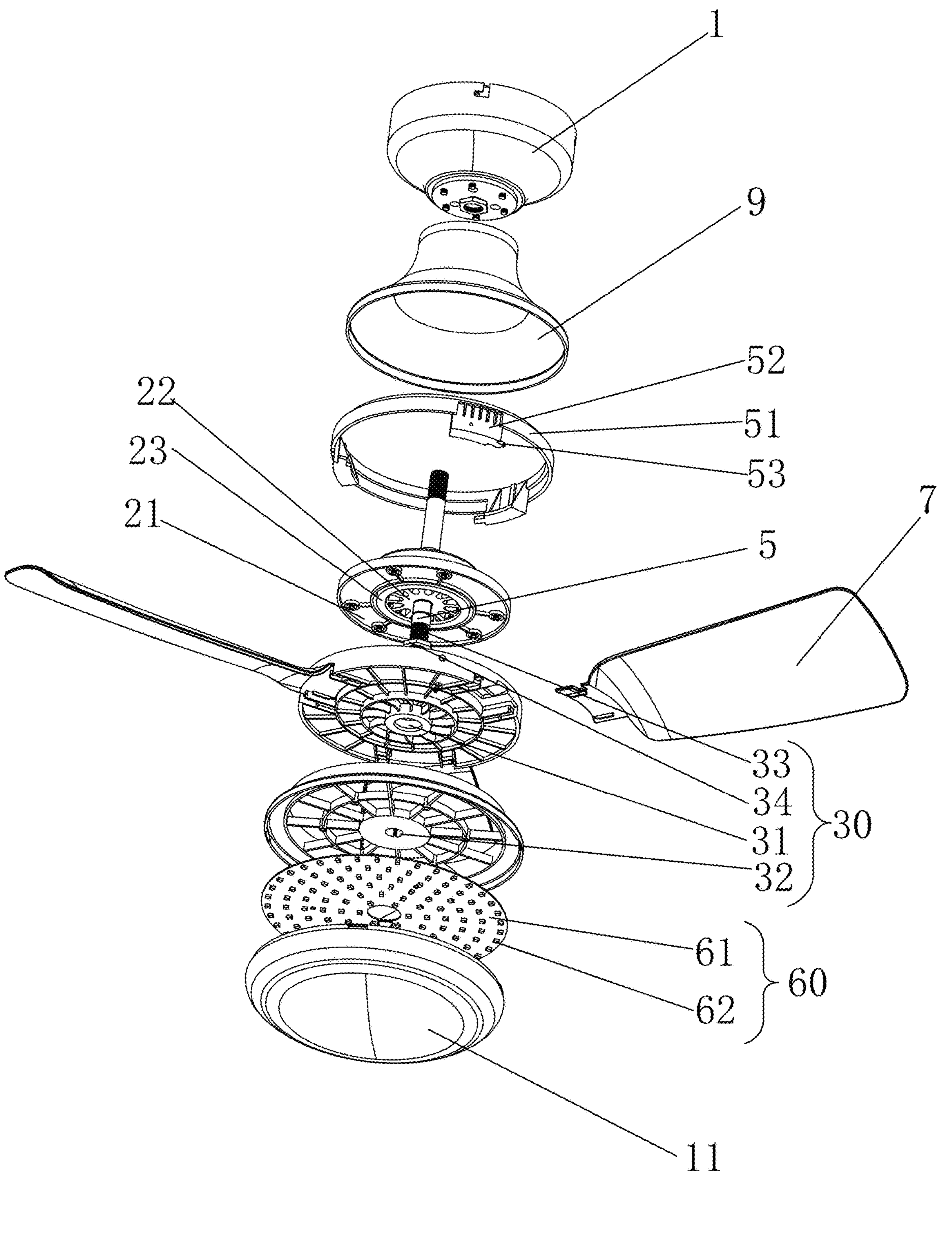
FIG. 3 is a second exploded view of the present disclosure.

Numeral reference: 1—ceiling panel; 2—suspension rod; 20—fan motor; 3—fan panel; 4—lamp panel; 5—connection rod; 6—clamp slot; 7—fan blade; 40—first clamping component; 8—rotating ring; 9—protective cover; 10—annular recess; 50—second clamping component; 60—LED light source; 11—lampshade; 70—cooling air duct; 41—buckle elastic piece; 42—clamp bulge piece; 43—bump block; 51—C-shaped buckle groove; 52—protruding portion; 53—clamp protrusion; 54—through groove; 91—locking screw; 61—LED light board; 62—LED light bead; 21—motor housing; 22—motor stator; 23—motor rotor; 24—annular plate; 31—first through hole; 32—second through hole; 33—external thread; 34—nut; 71—air inlet port; 72—wind blade; 73—air outlet port; 81—key slot; 82—spline.

DESCRIPTION OF EMBODIMENTS

The following specific description provides various different embodiments or examples for implementing the present disclosure. Of course, these are only embodiments or examples and are not intended to be limiting. Besides that, repeated numbering may be used in different embodiments, such as repeated numbers and/or letters. These repetitions are intended to provide a simple and clear description of the present disclosure, and do not represent any specific relationship between the different embodiments and/or structures discussed.

In addition, spatial terms such as "below", "under", "from inside out", "above", "up", and similar terms may be used to describe the relationship between one element or feature in the drawings and another. These spatial terms include different orientations of the device in use or operation, as well as the orientation described in the drawings. The device may be rotated in different directions or other orientations, and the spatial related adjectives used therein can also be interpreted accordingly. Therefore, they cannot be understood as limitations on the present disclosure. Terms "first" and "second" are only used for a descriptive purpose and cannot be understood as indicating or implying relative importance or implying the number of technical features indicated. Thus, features limited to "first" and "second" may explicitly or implicitly include one or more of these features.

The present disclosure is further described with reference to the accompanying drawings and specific embodiments. A fan lamp, as shown in FIGS. 1 to 7, includes a ceiling panel 1 that can be installed on a ceiling; a suspension rod 2 is connected to a bottom of the ceiling panel; a fan motor 20 is fixed to a bottom of the suspension rod 2, a fan panel 3 and a lamp panel 4 that are coaxial with the fan motor 20 are sequentially provided below the fan motor 20; a connection rod 5 that passes through the fan panel 3 and the lamp panel 4 in sequence is provided at a bottom of the fan motor 20, and a locking piece 30 is provided at a bottom of the connection rod 5.

Clamp slots 6 are provided on an outer wall of the fan panel 3 along a circumference, and fan blades 7 are inserted into the clamp slots 6.

A first clamping component 40 can fix the fan blades 7 in the clamp slots 6.

A rotating ring 8 is connected with a protective cover 9 at a bottom of the ceiling panel 1. An annular spacer region is formed between the fan panel 3 and the protective cover 9; a rotating ring 8 that can rotate along an axis of the fan motor 20 is provided on the annular spacer region. An annular recess 10 that communicates with the clamp slots 6 is provided on the fan panel 3. A second clamping component 50 that can extend into the clamp slots 6 and fix the fan blades 7 is provided at a bottom of the rotating ring 8.

A LED light source 60 is provided in the lamp panel 4, and a lampshade 11 is provided at a bottom of the lamp panel 4.

A cooling air duct 70 is provided between the fan motor 20 and the lamp panel 4. The cooling air duct 70 can allow air to enter from the fan motor 20, flow out from the lamp panel 4, and supply the LED light source 60 when the fan panel 3 is rotated.

In an implementation mode, the first clamping component 40 in the present disclosure includes a buckle spring piece 41 provided at tops of the clamp slots 6, and one end of the buckle spring piece 41 is inclined downward.

One ends of the fan blades 7 that are inserted into the clamp slots 6 are provided with a clamp bulge piece 42.

A bump block 43 is fixed on a top surface of the clamp bulge piece 42, and the clamp bulge piece 42 passes through the clamp slots 6. One end of the buckle spring piece 41 abuts against an outer end surface of the bump block 43 to prevent the fan blades from disengaging.

In an implementation mode of the present disclosure, the second clamping component 50 includes a C-shaped buckle groove 51 provided on a side of the clamp bulge piece 42; a protruding portion 52 that matches the number of clamp slots 6 is integrally formed on a bottom edge of the rotating ring 8. A bottom of a side of the protruding portion 52 is provided with a clamp protrusion 53.

The protruding portion 52 is located in the clamp slots 6 and extended into the annular recess 10. A through groove 54 is provided between the annular recess 10 and the clamp slots 6. The clamp protrusion 53 passes through the through groove 54 and is inserted into the C-shaped buckle groove 51 to position the fan blades.

In an implementation mode of the present disclosure, a side of the lamp panel 4 is provided with a locking screw 91.

The protruding portion 52 is rotated within the annular recess 10 and is locked and positioned by the locking screw 91.

In an implementation mode of the present disclosure, the number of the fan blades 7 is three, four, or five.

The number of the clamp slots 6 matches the number of the fan blades 7.

In an implementation mode of the present disclosure, the rotating ring 8 is a plastic structure or a metal structure.

In an implementation mode of the present disclosure, the LED light source 60 includes a LED light board 61 provided below the lamp panel 4, and LED light beads 62 are densely distributed at a bottom of the LED light board 61.

Threaded holes are respectively provided on the LED light board 61 and the lamp panel 4, and the LED light board 61 is connected to the lamp panel 4 through screws.

In an implementation mode of the present disclosure, the fan motor 20 is composed of a motor housing 21, a motor stator 22, and a motor rotor 23; an annular groove is formed between the motor housing 21 and the motor rotor 23. An annular plate 24 is provided on a top axis of the fan panel 3, and the annular plate 24 is inserted into the annular groove.

The annular plate 24 is adhered to the motor rotor 23, and when the motor rotor 23 is rotated, the annular plate 24 is driven to rotate by frictional force.

In an implementation mode of the present disclosure, the locking piece 30 includes a first through hole 31 provided on an axis of the fan panel 3, a second through hole 32 provided on an axis of the lamp panel 4, and the connection rod 5 sequentially passes through the first through hole 31 and the second through hole 32. An external thread 33 is provided at the bottom end of the connection rod 5, and a nut is threaded on the external thread 33.

In an implementation mode of the present disclosure, the cooling air duct 70 includes a plurality of air inlet ports 71 provided at a top of the motor housing 21 along a circumference, a top of the fan panel 3 that is located in the annular plate 24 is provided with a plurality of wind blades 72 along a circumference, and a plurality of air outlet ports 73 are provided on the lamp panel 4 along a circumference.

When the fan panel 3 is rotated, the wind blades 72 are rotated accordingly, air enters from the air inlet ports 71 and is sprayed from the air outlet ports 73, and air flow cools down the fan motor 20 and the LED light source 60.

Figure 4:
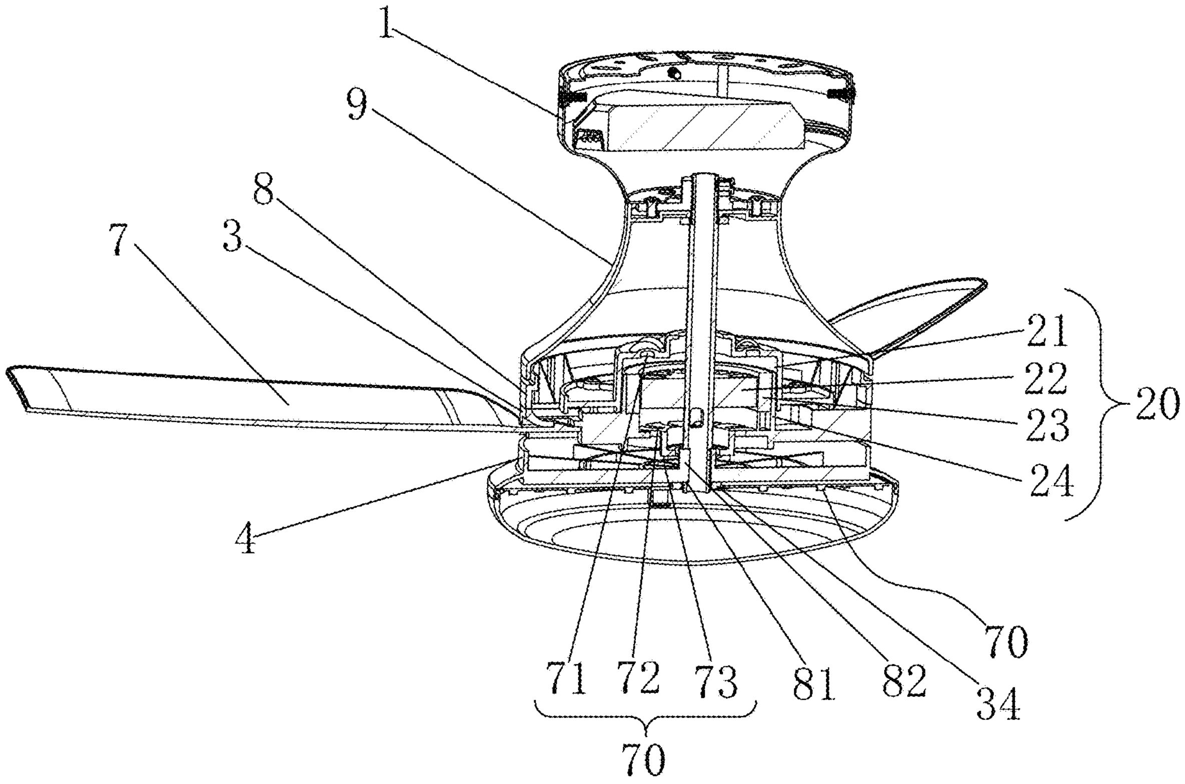
FIG. 4 is a sectional view of the present disclosure.
Figure 5:
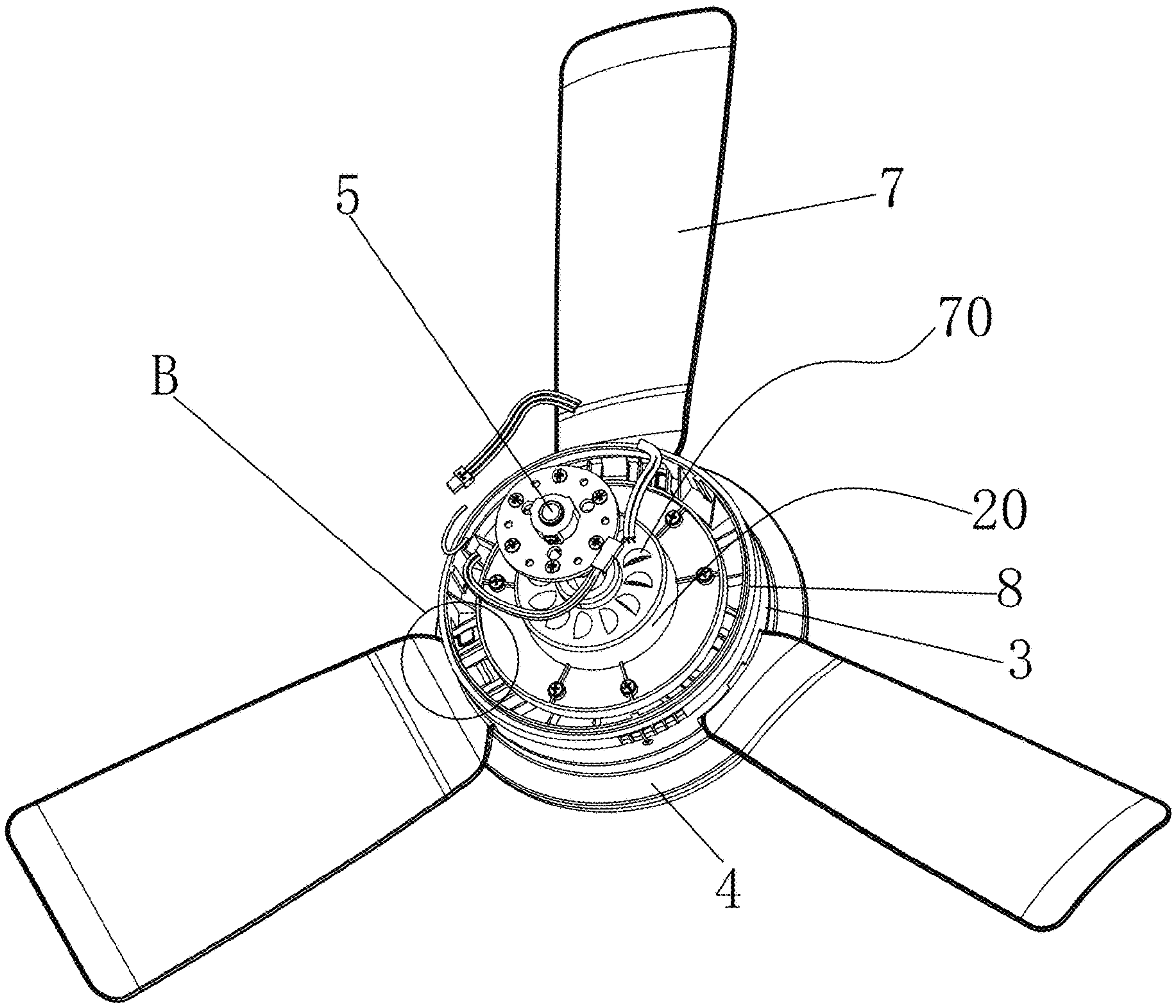
FIG. 5 is a schematic structural diagram of a protective cover being disassembled in the present disclosure.
Figure 6:
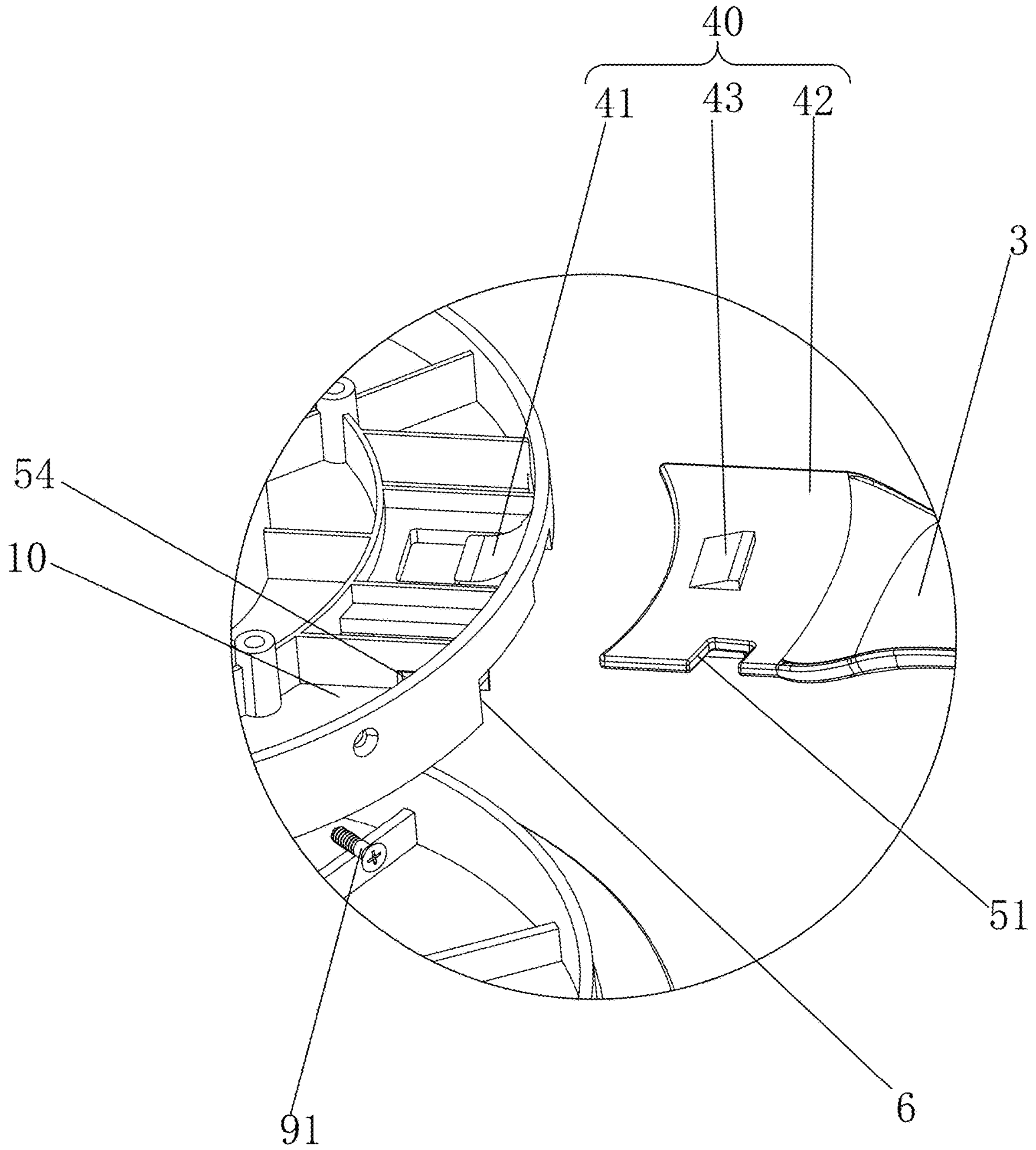
FIG. 6 is an enlarged view of part A in FIG. 2 of the present disclosure.
Figure 7:
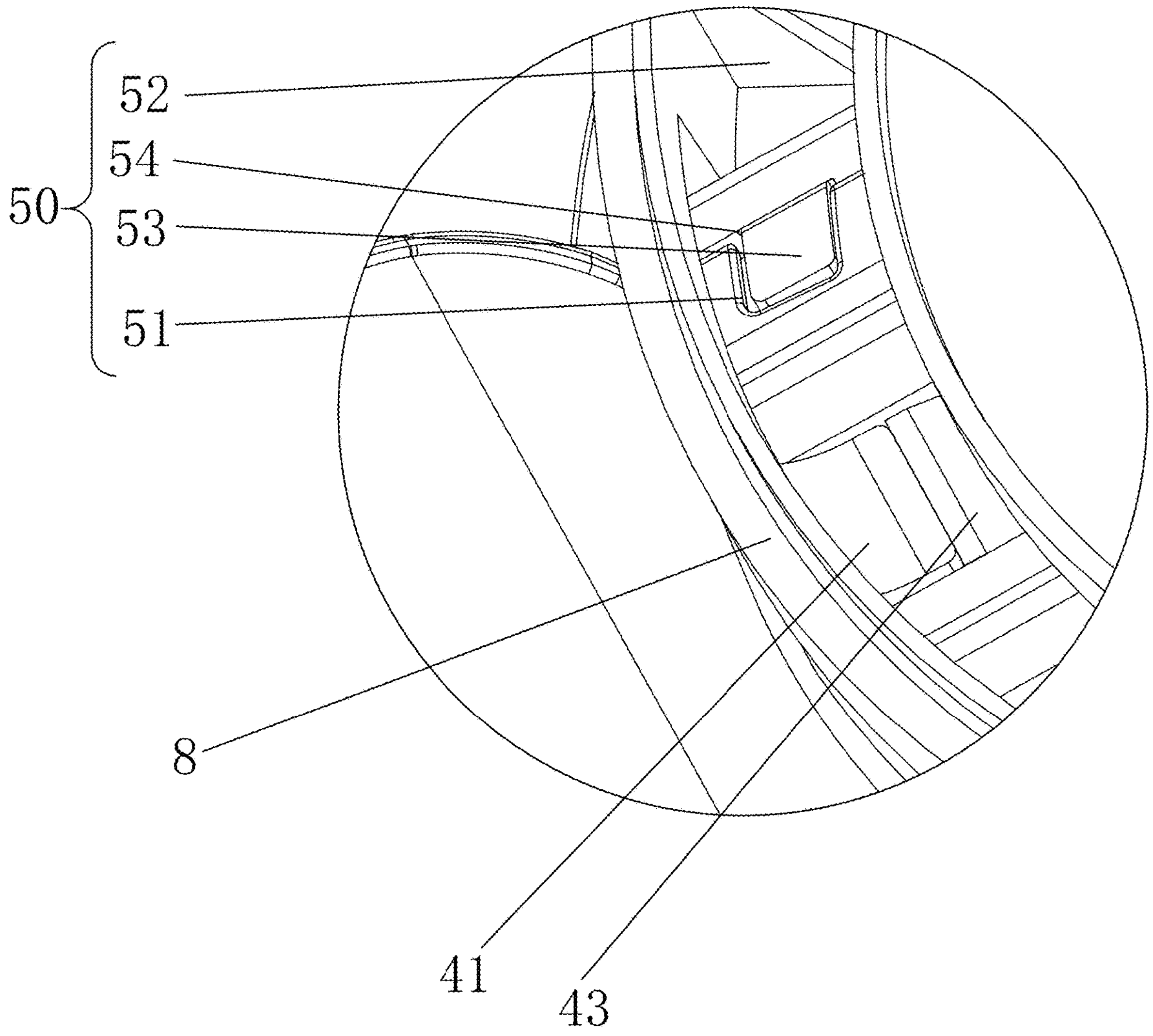
FIG. 7 is an enlarged view of part B in FIG. 5 of the present disclosure.

When in use: a nut is provided at the bottom of the ceiling panel 1, and an external thread that can be connected to the nut thread is provided at a top of the suspension rod 2; a key slot 81 is provided on one side of an outer wall of a bottom end of the connection rod 5, and a spline 82 that matches the key slot 81 is provided on an inner wall of the second through hole 32 on an axis of the lamp panel 4. In this way, when the fan panel 3 is rotated, the lamp panel 4 will not rotate along with it. A user can insert the clamp bulge piece 42 on one ends of the fan blades 7 into the clamp slots 6, and an end of the buckle spring piece 41 will abut against an outer end surface of the bump block 43 to prevent the fan blades from detaching and limit them. This is a first locking to the fan blades 7, and then the rotating ring 8 is manually rotated to cause it to rotate. The clamp protrusion 53 passes through the through groove 54 and is inserted into the C-shaped buckle groove 51 to position the fan blades. This is a second locking to the fan blades 7. Through two locking operations, the fan blades 7 can be firmly fixed on the fan panel 3, threaded holes are provided on the rotating ring 8, and the locking screw 91 will be twisted into the locking screw 91 and press the protruding portion 52 on the rotating ring 8 through one end of the locking screw 91, thereby fixing the rotating ring 8 so that it cannot be rotated. The first through hole 31 and the second through hole 32 on the fan panel 3 and the lamp panel 4 are inserted into the connection rod 5 in sequence, the spline 82 is aligned with the key slot 81, and the spline 82 is inserted into the key slot 81. In this way, when the fan panel 3 is rotated, the lamp panel 4 will not rotate with it. Then, it is connected and fixed through a thread connection between the external thread 33 and the nut 34, as shown in FIG. 4. After fixing the fan panel 3 and the lamp panel 4 with the nut 34, the annular plate 24 on the fan panel 3 will be inserted in the annular groove formed between the motor housing 21 and the motor rotor 23, the annular plate 24 will be adhered with the motor rotor 23. When the motor rotor 23 is rotated, the annular plate 24 is driven to rotate by friction. At the same time, when the fan lamp is rotated, the wind blades 72 provided on the fan panel 3 are rotated, air can be drawn into the motor housing 21 through the air inlet ports 71, and then discharged from the air outlet ports 73 of the lamp panel 4. In this process, the air first passes through the motor stator 22 and the motor rotor 23 on the motor to cool it down. When discharged from the air outlet ports 73, the LED light source 60 below the lamp panel is cooled, which can reduce the temperature of the fan motor 20 and the LED light source 60 during operation, thereby improving the service life of the fan lamp.

The above displays and describes the basic principles and main features of the prevent disclosure, as well as the advantages of the present disclosure. Those skilled in the art should understand that the present disclosure is not limited by the above embodiments. The above embodiments and specifications only illustrate the principles of the present disclosure. Without departing from the spirit and scope of the present disclosure, there will be various changes and improvements to the present disclosure, which fall within the scope of the present disclosure. The protection scope of the present disclosure is defined by the accompanying claims and their equivalents.

What is claimed is:

1. A fan lamp, comprising a ceiling panel that is capable of being installed on a ceiling, a suspension rod is connected to a bottom of the ceiling panel; a fan motor is fixed at a bottom of the suspension rod; a fan panel and a lamp panel that are coaxial with the fan motor are provided below the fan motor in sequence; a connection rod passing through the fan panel and the lamp panel in sequence is provided at a bottom of the fan motor; and a locking piece is provided at a bottom of the connection rod; wherein a plurality of clamp slots are provided on an outer wall of the fan panel along a circumference, and fan blades are inserted into the clamp slots; a first clamping component fixes the fan blades in the clamp slots; a rotating ring is connected with a protective cover at the bottom of the ceiling panel, thereby forming an annular spacer region between the fan panel and the protective cover; the rotating ring rotates along an axis of the fan motor is provided on the annular spacer region; an annular recess communicates with the clamp slots is provided on the fan panel; a second clamping component that extends into the clamp slots and fixing the fan blades is provided at a bottom of the rotating ring; a LED light source is provided in the lamp panel, and a lampshade is provided at a bottom of the lamp panel; a cooling air duct is provided between the fan motor and the lamp panel; the cooling air duct allows air to enter from the fan motor, flow out from the lamp panel, and supply to the LED light source when the fan panel is rotated.

2. The fan lamp according to claim 1, wherein the first clamping component comprises a buckle elastic piece provided at tops of the clamp slots, and one end of the buckle elastic piece is inclined downward;

one ends of the fan blades that are inserted into the clamp slots are provided with a clamp bulge piece;

a bump block is fixed on a top surface of the clamp bulge piece, and the clamp bulge piece passes through the clamp slots;

one end of the buckle elastic piece abuts against an outer end surface of the bump block to prevent the fan blades from slipping out.

3. The fan lamp according to claim 1, wherein a locking screw is provided on a side of the lamp panel;

the protruding portion is rotated within the annular recess and is locked and positioned by the locking screw.

4. The fan lamp according to claim 1, wherein the number of the fan blades is three, four, or five;

the number of the clamp slots matches the number of the fan blades.

5. The fan lamp according to claim 1, wherein the rotating ring is a plastic structure or a metal structure.

6. The fan lamp according to claim 1, wherein the LED light source comprises a LED light board provided below the lamp panel, and LED light beads are distributed at a bottom of the LED light board;

threaded holes are respectively provided on the LED light board and the lamp panel, and the LED light board is connected to the lamp panel through screws.

7. The fan lamp according to claim 1, wherein the fan motor is composed of a motor housing, a motor stator, and a motor rotor;

an annular groove is formed between the motor housing and the motor rotor;

an annular plate is provided on a top axis of the fan panel, and the annular plate is inserted into the annular groove;

the annular plate is adhered to the motor rotor, when the motor rotor is rotated, the annular plate is driven to rotate by frictional force.

8. The fan lamp according to claim 2, wherein the second clamping component comprises a C-shaped buckle groove provided on a side of the clamp bulge piece, a protruding portion that matches the number of the clamp slots is integrally formed on a bottom edge of the rotating ring, and a clamp protrusion is provided at a bottom of a side of the protruding portion;

the protruding portion is located in the clamp slots and extended into the annular recess;

a through groove is provided between the annular recess and the clamp slots;

the clamp protrusion passes through the through groove and is inserted into the C-shaped buckle groove to position the fan blades.

9. The fan lamp according to claim 7, wherein the locking piece comprises a first through hole provided on an axis of the fan panel, a second through hole provided on an axis of the lamp panel, and the connection rod sequentially passes through the first through hole and the second through hole;

an external thread is provided at the bottom of the connection rod, and a nut is threaded on the external thread.

10. The fan lamp according to claim 7, wherein the cooling air duct comprises a plurality of air inlet ports provided at a top of the motor housing along a circumference, a top of the fan panel that is located in the annular plate is provided with a plurality of wind blades along a circumference, and a plurality of air outlet ports are provided on the lamp panel along a circumference;

when the fan panel is rotated, the wind blades are rotated accordingly, air enters from the air inlet ports and is sprayed out from the air outlet ports, and air flow cools down the fan motor and the LED light source.

* * * * *